(12) United States Patent
Kamiya et al.

(10) Patent No.: US 10,864,770 B2
(45) Date of Patent: Dec. 15, 2020

(54) BICYCLE HUB UNIT AND BICYCLE WHEEL ASSEMBLY

(71) Applicant: Shimano Inc., Sakai (JP)

(72) Inventors: Mitsuru Kamiya, Sakai (JP); Keita Tanaka, Sakai (JP)

(73) Assignee: Shimano Inc., Sakai (JP)

( * ) Notice: Subject to any disclaimer, the term of this patent is extended or adjusted under 35 U.S.C. 154(b) by 344 days.

(21) Appl. No.: 15/975,702

(22) Filed: May 9, 2018

(65) Prior Publication Data

US 2019/0126671 A1 May 2, 2019

(30) Foreign Application Priority Data

Oct. 27, 2017 (JP) ................................. 2017-208498

(51) Int. Cl.
 *B60B 1/04* (2006.01)
 *B60B 27/02* (2006.01)
 *B60B 1/00* (2006.01)

(52) U.S. Cl.
 CPC .............. *B60B 1/041* (2013.01); *B60B 1/003* (2013.01); *B60B 27/023* (2013.01)

(58) Field of Classification Search
 CPC ....... B60B 27/023; B60B 27/02; B60B 27/04; B60B 27/047; B60B 27/0021; B60B 27/0026; B60B 27/0031; B60B 1/041
 See application file for complete search history.

(56) References Cited

U.S. PATENT DOCUMENTS

| 5,515,957 A | * | 5/1996 | McConaghy | ........... F16D 41/28 192/64 |
| 6,030,052 A | | 2/2000 | Watari et al. | |
| 7,166,054 B2 | * | 1/2007 | Urabe | .................... B62M 11/18 301/110.5 |
| 7,442,146 B2 | * | 10/2008 | Okouchi | ................ B62M 11/16 301/110.5 |
| 2004/0135425 A1 | | 7/2004 | Irie | |
| 2005/0184581 A1 | | 8/2005 | Watari et al. | |
| 2008/0224530 A1 | * | 9/2008 | Frank | ..................... B62M 11/16 301/110.5 |
| 2009/0230758 A1 | * | 9/2009 | Schneider | .............. B62M 11/16 301/110.5 |

(Continued)

FOREIGN PATENT DOCUMENTS

| DE | 3417203 A1 | 11/1985 |
| EP | 0065414 A1 | 11/1982 |

(Continued)

*Primary Examiner* — Jason R Bellinger
(74) *Attorney, Agent, or Firm* — Alleman Hall Creasman & Tuttle LLP

(57) ABSTRACT

To provide a bicycle hub unit and a bicycle wheel assembly that allow a wheel unit to be appropriately coupled to a hub body, a bicycle hub unit is coupled to a rotary body to which a brake is applied by a brake device. The bicycle hub unit includes a hub body that rotates around a hub axle and a rotary body coupling portion that couples the rotary body to the hub body. The hub body includes a first joint portion and a second joint portion. The first joint portion includes an external thread coupled to an internal thread of the wheel unit. The second joint portion is coupled to a restriction member that restricts relative rotation of the first joint portion and the wheel unit.

31 Claims, 5 Drawing Sheets

(56) References Cited

U.S. PATENT DOCUMENTS

2011/0068618 A1* 3/2011 Antal ..................... B60B 5/02
 301/110.5
2011/0084544 A1* 4/2011 Thorpe ................ B60B 27/023
 301/110.5

FOREIGN PATENT DOCUMENTS

| EP | 2360028 A1 | 8/2011 |
| JP | S5783711 A | 5/1982 |
| JP | S57184308 U | 11/1982 |
| JP | H09280239 A | 10/1997 |
| JP | H10193905 A | 7/1998 |
| JP | 2004210242 A | 7/2004 |
| JP | 2005231501 A | 9/2005 |
| JP | 2007062718 A | 3/2007 |
| JP | 2012011840 A | 1/2012 |

* cited by examiner

BICYCLE HUB UNIT AND BICYCLE WHEEL ASSEMBLY

BACKGROUND ART

The present invention relates to a bicycle hub unit and a bicycle wheel assembly.

A known bicycle hub unit is coupled to a rotary body to which a brake is applied by a brake device. A prior art bicycle hub unit includes a hub axle, which is coupled to a frame of a bicycle, and a hub body, which is coupled to a wheel unit of the bicycle and rotates around the hub axle. One example of a brake device is a roller brake device. Patent document 1 discloses one example of a prior art bicycle hub unit.

Patent Document 1: Japanese Laid-Open Patent Publication No. 2007-62718

SUMMARY OF THE INVENTION

It is preferred that a wheel unit be appropriately coupled to a hub body.

It is an object of the present invention to provide a bicycle hub unit and a bicycle wheel assembly that allow a wheel unit to be appropriately coupled to a hub body.

In accordance with a first aspect of the present invention, a bicycle hub unit is coupled to a rotary body to which a brake is applied by a brake device. The bicycle hub unit includes a hub body that rotates around a hub axle and a rotary body coupling portion that couples the rotary body to the hub body. The hub body includes a first joint portion and a second joint portion. The first joint portion includes an external thread coupled to an internal thread of a wheel unit. The second joint portion is coupled to a restriction member that restricts relative rotation of the first joint portion and the wheel unit.

The restriction member restricts relative rotation of the first joint portion and the wheel unit. This limits loosening of the internal thread of the wheel unit with respect to the external thread of the first joint portion. Thus, the wheel unit is appropriately coupled to the hub body.

In accordance with a second aspect of the present invention, the bicycle hub unit according to the first aspect is configured so that the second joint portion is arranged on an outer circumference of the hub body.

Thus, the configuration of the second joint portion is simplified.

In accordance with a third aspect of the present invention, the bicycle hub unit according to the second aspect is configured so that the second joint portion includes an external thread coupled to an internal thread of the restriction member.

Thus, the configuration of the second joint portion is simplified.

In accordance with a fourth aspect of the present invention, the bicycle hub unit according to the third aspect is configured so that the external thread of the second joint portion differs in shape from the external thread of the first joint portion.

Thus, the restriction member appropriately restricts relative rotation of the first joint portion and the wheel unit.

In accordance with a fifth aspect of the present invention, the bicycle hub unit according to the fourth aspect is configured so that the external thread of the second joint portion differs in pitch from the external thread of the first joint portion.

In a direction extending along the center axis of the hub body, a movement amount of the wheel unit corresponding to rotation of the wheel unit with respect to the first joint portion differs from a movement amount of the restriction member corresponding to rotation of the restriction member with respect to the second joint portion. Thus, even in a case where force generated by the rotation of the wheel unit relative to the first joint portion is applied to the restriction member, the restriction member resists rotating relative to the second joint portion. With the bicycle hub unit according to the fifth aspect, the restriction member appropriately restricts relative rotation of the first joint portion and the wheel unit.

In accordance with a sixth aspect of the present invention, the bicycle hub unit according to the fifth aspect is configured so that the external thread of the second joint portion has a shorter pitch than the external thread of the first joint portion.

The restriction member appropriately restricts relative rotation of the first joint portion and the wheel unit. Thus, the wheel unit is appropriately coupled to the hub body.

In accordance with a seventh aspect of the present invention, the bicycle hub unit according to any one of the fourth to sixth aspects is configured so that the external thread of the second joint portion and the external thread of the first joint portion are wound in opposite directions.

In a direction extending along the center axis of the hub body, a movement direction of the wheel unit corresponding to rotation of the wheel unit relative to the first joint portion differs from a movement direction of the restriction member corresponding to rotation of the restriction member relative to the second joint portion. Thus, even in a case where force generated by the rotation of the wheel unit relative to the first joint portion is applied to the restriction member, the restriction member resists rotating relative to the second joint portion. With the bicycle hub unit according to the seventh aspect, the restriction member appropriately restricts relative rotation of the first joint portion and the wheel unit.

In accordance with an eighth aspect of the present invention, the bicycle hub unit according to the seventh aspect is configured so that the winding direction of the external thread of the first joint portion is right-handed, and the winding direction of the external thread of the second joint portion is left-handed.

The restriction member appropriately restricts relative rotation of the first joint portion and the wheel unit. Thus, the wheel unit is appropriately coupled to the hub body.

In accordance with a ninth aspect of the present invention, the bicycle hub unit according to any one of the third to eighth aspects is configured so that in a direction extending along a center axis of the hub body, a range in which the external thread of the first joint portion is arranged is wider than a range in which the external thread of the second joint portion is arranged.

Thus, the wheel unit is appropriately coupled to the hub body.

In accordance with a tenth aspect of the present invention, the bicycle hub unit according to any one of the second to ninth aspects is configured so that the hub body further includes a large diameter portion and a small diameter portion, and the second joint portion is arranged on an outer circumference of the small diameter portion.

Thus, the hub body and the restriction member are reduced in size.

In accordance with an eleventh aspect of the present invention, the bicycle hub unit according to the tenth aspect is configured so that the first joint portion is arranged on an outer circumference of the large diameter portion.

Thus, the wheel unit is easily coupled to the first joint portion.

In accordance with a twelfth aspect of the present invention, the bicycle hub unit according to the eleventh aspect is configured so that the large diameter portion has a smaller outer diameter than the restriction member.

Thus, the restriction member appropriately restricts relative rotation of the first joint portion and the wheel unit.

In accordance with a thirteenth aspect of the present invention, the bicycle hub unit according to the eleventh or twelfth aspects is configured so that the large diameter portion includes a first large diameter end located toward the small diameter portion, a second large diameter end opposite to the first large diameter end, a first large diameter portion including the first large diameter end, and a second large diameter portion including the second large diameter end. The first joint portion is arranged on an outer circumference of the first large diameter portion.

Thus, the wheel unit is appropriately coupled to the hub body.

In accordance with a fourteenth aspect of the present invention, the bicycle hub unit according to the thirteenth aspect is configured so that the second large diameter portion includes a tapered portion. The taper portion has an outer diameter that increases at positions away from the first joint portion in a direction extending along a center axis of the hub body.

In a direction extending along the center axis of the hub body, the restriction member restricts relative rotation of the wheel unit and the first joint portion in one direction, and the tapered portion restricts relative rotation of the wheel unit and the first joint portion in the other direction. Thus, the wheel unit is appropriately coupled to the hub body.

In accordance with a fifteenth aspect of the present invention, the bicycle hub unit according to any one of the first to fourteenth aspects further includes a transmission portion that transmits at least human driving force to the hub body.

Thus, the wheel unit is appropriately coupled to the hub body.

In accordance with a sixteenth aspect of the present invention, the bicycle hub unit according to the fifteenth aspect further includes a shifting mechanism that changes speed of an input from the transmission portion and transmits the input to the wheel unit.

Thus, the rider can comfortably ride the bicycle.

In accordance with a seventeenth aspect of the present invention, the bicycle hub unit according to the sixteenth aspect is configured so that the shifting mechanism is configured to change a transmission ratio of the transmission portion and the wheel unit.

Thus, the rider can ride the bicycle at transmission ratios suitable for the rider.

In accordance with an eighteenth aspect of the present invention, the bicycle hub unit according to the seventeenth aspect is configured so that the shifting mechanism has at least three transmission ratios or more.

Thus, the rider can ride the bicycle at transmission ratios suitable for the rider.

In accordance with a nineteenth aspect of the present invention, the bicycle hub unit according to any one of the sixteenth to eighteenth aspects is configured so that the shifting mechanism is located at a radially inner side of the hub body.

Thus, the shifting mechanism can be arranged inside the hub body.

In accordance with a twentieth aspect of the present invention, the bicycle hub unit according to any one of the first to nineteenth aspects further includes the hub axle.

Thus, the wheel unit is appropriately coupled to the hub body.

In accordance with a twenty-first aspect of the present invention, a bicycle wheel assembly includes the bicycle hub unit according to any one of the first to twentieth aspects, the wheel unit, and the restriction member. The wheel unit includes a hub coupling portion coupled to the hub body.

The restriction member restricts relative rotation of the first joint portion and the wheel unit. This limits loosening of the internal thread of the hub coupling portion with respect to the external thread of the first joint portion. Thus, the wheel unit is appropriately coupled to the hub body.

In accordance with a twenty-second aspect of the present invention, the bicycle wheel assembly according to the twenty-first aspect is configured so that the restriction member includes a nut, and the second joint portion includes an external thread coupled to an internal thread of the nut.

Thus, the restriction member is appropriately coupled to the second joint portion.

In accordance with a twenty-third aspect of the present invention, the bicycle wheel assembly according to the twenty-second aspect is configured so that the hub coupling portion includes a first tapered surface. The restriction member includes a second tapered surface in contact with the first tapered surface. The first tapered surface has a diameter that decreases toward the restriction member in a direction extending along a center axis of the hub body. The second tapered surface has a diameter that increases toward the hub coupling portion in the direction extending along the center axis of the hub body.

The contact of the first tapered surface with the second tapered surface causes the hub coupling portion and the restriction member to be forced against the hub body. This restricts rotation of the wheel unit relative to the hub body. Thus, the wheel unit is appropriately coupled to the hub body.

In accordance with a twenty-fourth aspect of the present invention, the bicycle wheel assembly according to the twenty-third aspect is configured so that the hub coupling portion has a center axis that is not aligned with the center axis of the hub body.

With the restriction member coupled to the second joint portion, the first tapered surface is in strong contact with the second tapered surface. The hub coupling portion and the restriction member are strongly forced against the hub body. Thus, rotation of the wheel unit relative to the hub body is appropriately restricted, and the wheel unit is appropriately coupled to the hub body.

In accordance with a twenty-fifth aspect of the present invention, the bicycle wheel assembly according to the twenty-fourth aspect is configured so that the restriction member has a center axis that is aligned with the center axis of the hub body.

Thus, rotation of the wheel unit relative to the hub body is appropriately restricted, and the wheel unit is appropriately coupled to the hub body.

In accordance with a twenty-sixth aspect of the present invention, the bicycle wheel assembly according to any one of the twenty-first to twenty-fifth aspects is configured so that the wheel unit further includes a rim.

Thus, the rim is appropriately coupled to the hub body.

In accordance with a twenty-seventh aspect of the present invention, the bicycle wheel assembly according to the twenty-sixth aspect is configured so that a material forming the rim includes at least a resin.

This contributes to weight reduction of the rim.

In accordance with a twenty-eighth aspect of the present invention, the bicycle wheel assembly according to the twenty-sixth or twenty-seventh aspect is configured so that the wheel unit further includes a spoke that connects the rim and the hub coupling portion.

Thus, the spoke is appropriately coupled to the hub body.

In accordance with a twenty-ninth aspect of the present invention, the bicycle wheel assembly according to the twenty-eighth aspect is configured so that a material forming the spoke includes at least a resin.

This contributes to weight reduction of the spoke.

In accordance with a thirtieth aspect of the present invention, the bicycle wheel assembly according to the twenty-eighth or twenty-ninth aspect is configured so that the spoke is arranged integrally with at least one of the hub coupling portion and the rim.

Thus, the number of components in the wheel unit is reduced.

In accordance with a thirty-first aspect of the present invention, the bicycle wheel assembly according to any one of the twenty-first to thirtieth aspects is configured so that a material forming the hub coupling portion includes at least a resin.

This contributes to weight reduction of the hub coupling portion.

In accordance with a thirty-second aspect of the present invention, the bicycle wheel assembly according to any one of the twenty-first to thirty-first aspects is configured so that the bicycle wheel assembly is a rear wheel.

Thus, the wheel unit of the rear wheel is appropriately coupled to the hub body.

The bicycle hub unit and the bicycle wheel assembly of the present invention allow the wheel unit to be appropriately coupled to the hub body.

EMBODIMENTS OF THE INVENTION

First Embodiment

Figure 1:
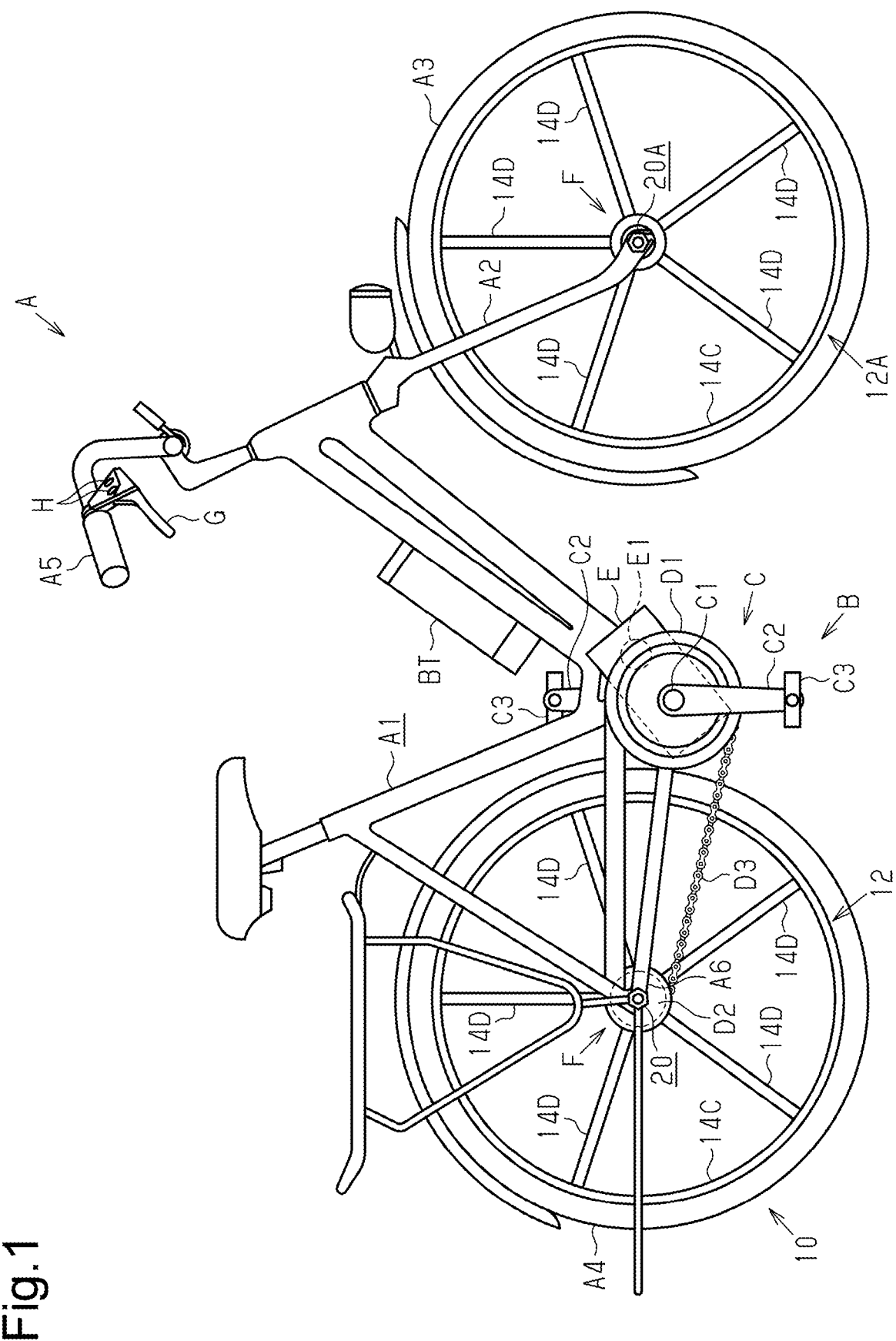
FIG. 1 is a side view of a bicycle including a first embodiment of a bicycle hub unit.

A bicycle A including a bicycle hub unit 20 will now be described with reference to FIG. 1.

The bicycle A includes the bicycle hub unit 20 (hereafter, referred to as "the hub unit 20"). The type of the bicycle A shown in the drawings is a city cycle. The type of the bicycle can be a road bike, a mountain bike, a trekking bike, or a cross bike. The bicycle A further includes a frame A1, a front fork A2, a front wheel A3, a rear wheel A4, a handlebar A5, and a drivetrain B.

The hub unit 20 is provided on at least one of the front wheel A3 and the rear wheel A4. In one example, the hub unit 20 is provided on the rear wheel A4 and the hub unit 20 is arranged on a rear end A6 of the frame A1. A bicycle hub unit 20A (hereafter, referred to as "the hub unit 20A") provided on the front wheel A3 is arranged on the front fork A2. The hub unit 20A is, for example, the hub unit 20 that does not include a shifting mechanism 44 (refer to FIG. 3), which will be described later.

The drivetrain B includes a crank assembly C, a front sprocket D1, a rear sprocket D2, and a chain D3. The crank assembly C includes a crankshaft C1, two crank arms C2, and two pedals C3. The two pedals C3 are rotatably coupled to the distal ends of the crank arms C2.

The front sprocket D1 is arranged on the crank assembly C to rotate integrally with the crankshaft C1. The rear sprocket D2 is arranged on the hub unit 20 of the rear wheel A4. The chain D3 runs around the front sprocket D1 and the rear sprocket D2. Human driving force applied by the rider of the bicycle A to the pedals C3 is transmitted via the front sprocket D1, the chain D3, and the rear sprocket D2 to the rear wheel A4.

The bicycle A further includes an electric assist unit E. The electric assist unit E operates to assist propulsion of the bicycle A. The electric assist unit E operates, for example, in accordance with human driving force applied to the pedals C3. The electric assist unit E includes an electric motor E1. The electric assist unit E is driven by electric power supplied from a battery BT mounted on the bicycle A. The electric assist unit E and the battery BT can be omitted from the bicycle A.

The bicycle A further includes two brake devices F. The brake devices F are mechanically or electrically driven to apply brakes on rotary bodies F1 (refer to FIG. 3) of the bicycle A in accordance with operation of operating devices G. The operating devices G are arranged, for example, on the handlebar A5. One of the brake devices F is arranged on the front wheel A3. The other one of the brake devices F is arranged on the rear wheel A4. The brake devices F are, for example, hub brake devices in which the rotary bodies F1 are directly coupled to the hub units 20 and 20A. The brake devices F are, for example, hub brake devices in which force applied to the rotary bodies F1 is transmitted to the hub units 20 and 20A not via rims 14C. In one example, the brake devices F are roller brake devices (refer to FIG. 3). In this example, the rotary bodies F1 are brake drums (refer to FIG. 3) respectively arranged on the brake devices F to be rotatable with respect to the frame A1.

The bicycle A further includes a bicycle wheel assembly 10 (hereafter, referred to as "the wheel assembly 10"). The wheel assembly 10 is the rear wheel A4. The wheel assembly 10 includes the hub unit 20. One of the rotary bodies F1 to which brakes are applied by the brake devices F is coupled to the hub unit 20 (refer to FIG. 3).

The wheel assembly 10 further includes a wheel unit 12. The wheel unit 12 includes a hub coupling portion 14A (refer to FIG. 2) coupled to the hub unit 20. One of the materials forming the hub coupling portion 14A includes at least a resin. The hub coupling portion 14A is coupled to the hub unit 20, for example, to cover the hub unit 20. The wheel unit 12 further includes a rim 14C. One of the materials forming the rim 14C includes at least a resin. The wheel unit 12 further includes spokes 14D connecting the rim 14C and the hub coupling portion 14A. One of the materials forming the spokes 14D includes at least a resin. The number of the spokes 14D is, for example, five. The spokes 14D are arranged integrally with at least one of the hub coupling portion 14A and the rim 14C. In one example of the wheel unit 12, the hub coupling portion 14A, the rim 14C, and all of the plurality of spokes 14D are arranged integrally with each other. A wheel unit 12A coupled to the hub unit 20A of the front wheel A3 has, for example, the same structure as the wheel unit 12 of the rear wheel A4.

The structure of the hub unit 20 will now be described with reference to FIGS. 2 and 3. FIG. 3 does not show a part of the wheel unit 12.

Figure 2:
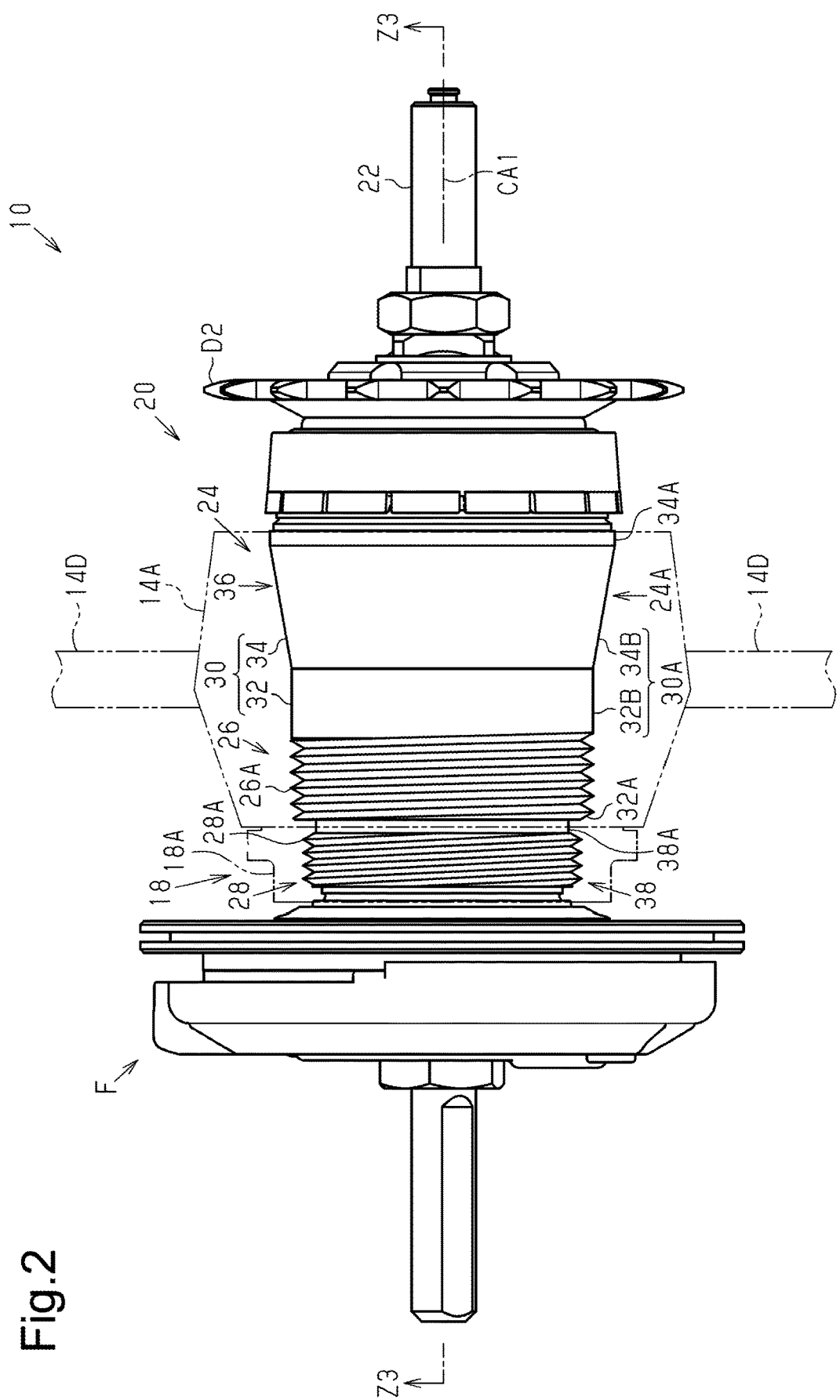
FIG. 2 is a front view of a bicycle wheel assembly shown in FIG. 1.
Figure 3:
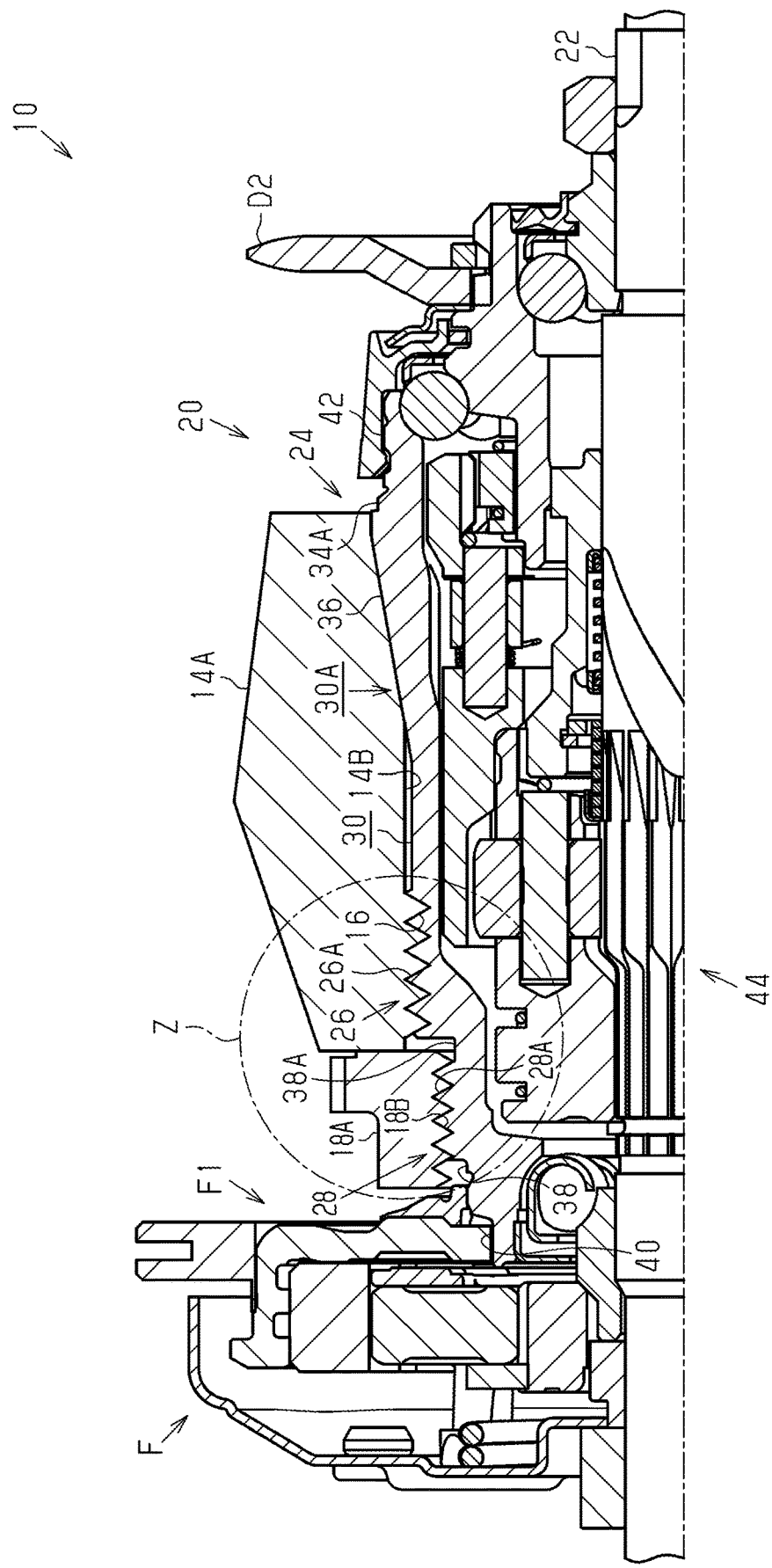
FIG. 3 is a cross-sectional view taken along line Z3-Z3 in FIG. 2.

As shown in FIG. 2, the hub unit 20 includes a hub body 24, which rotates around a hub axle 22, and a rotary body coupling portion 40 (refer to FIG. 3), which couples the rotary body F1 to the hub body 24. In one example, the rotary body F1 is coupled to the rotary body coupling portion 40 so that the rotary body F1 is fixed to the rotary body coupling portion 40 so as to rotate integrally with the hub body 24 about a center axis CA1 of the hub body 24. The hub unit 20 further includes the hub axle 22.

The hub body 24 includes a first joint portion 26 and a second joint portion 28. The first joint portion 26 includes an external thread 26A coupled to an internal thread 16 (refer to FIG. 3) of the wheel unit 12. The second joint portion 28 is coupled to a restriction member 18 restricting relative rotation of the first joint portion 26 and the wheel unit 12. The internal thread 16 of the wheel unit 12 is arranged, for example, on the hub coupling portion 14A (refer to FIG. 3). In one example, the hub coupling portion 14A is coupled to an outer circumference 24A of the hub body 24. The wheel assembly 10 further includes the restriction member 18.

The hub body 24 further includes a large diameter portion 30 and a small diameter portion 38. The large diameter portion 30 and the small diameter portion 38 are arranged, for example, integrally with each other. The large diameter portion 30 has a larger outer diameter than the small diameter portion 38. The rotary body coupling portion 40 is coupled to, for example, the small diameter portion 38 (refer to FIG. 3). The large diameter portion 30 includes a first large diameter end 32A located toward the small diameter portion 38, a second large diameter end 34A opposite to the first large diameter end 32A, a first large diameter portion 32 including the first large diameter end 32A, and a second large diameter portion 34 including the second large diameter end 34A. The outer circumference 24A of the hub body 24 includes an outer circumference 30A of the large diameter portion 30 and an outer circumference 38A of the small diameter portion 38. The outer circumference 30A of the large diameter portion 30 includes an outer circumference 32B of the first large diameter portion 32 and an outer circumference 34B of the second large diameter portion 34. In one example, the first large diameter portion 32 and the second large diameter portion 34 are arranged integrally with each other so that the outer circumference 32B of the first large diameter portion 32 is continuous with the outer circumference 34B of the second large diameter portion 34.

The first joint portion 26 is arranged on the outer circumference 24A of the hub body 24. In one example, the first joint portion 26 is arranged on the outer circumference 30A of the large diameter portion 30. More specifically, the first joint portion 26 is arranged on the outer circumference 32B of the first large diameter portion 32. The internal thread 16 of the wheel unit 12 is arranged, for example, on an inner circumferential surface 14B of the hub coupling portion 14A at a portion corresponding to the external thread 26A of the first joint portion 26 (refer to FIG. 3). In one example, the wheel unit 12 is inserted into the large diameter portion 30 from the side of the rotary body coupling portion 40 in a direction extending along the center axis CA1 of the hub body 24, and the internal thread 16 is coupled to the external thread 26A. In the example shown in FIG. 2, the winding direction of the external thread 26A of the first joint portion 26 is right-handed. That is, the external thread 26A of the first joint portion 26 is a right-handed thread.

The second joint portion 28 is arranged on the outer circumference 24A of the hub body 24. In one example, the second joint portion 28 is arranged on the outer circumference 38A of the small diameter portion 38. The second joint portion 28 includes an external thread 28A coupled to an internal thread 18B of the restriction member 18 (refer to FIG. 3). In one example, the restriction member 18 is inserted into the small diameter portion 38 from the side of the rotary body coupling portion 40 in a direction extending along the center axis CA1 of the hub body 24, and the internal thread 18B is coupled to the external thread 28A. In the example shown in FIG. 2, the winding direction of the external thread 28A of the second joint portion 28 is right-handed. That is, the external thread 28A of the second joint portion 28 is a right-handed thread. The restriction member 18 includes a nut 18A. The nut 18A includes the internal thread 18B. In one example, the internal thread 18B of the nut 18A is coupled to the external thread 28A of the second joint portion 28. The large diameter portion 30 has a smaller outer diameter than the restriction member 18.

The second large diameter portion 34 includes a tapered portion 36. The tapered portion 36 is arranged on the outer circumference 34B of the second large diameter portion 34. The tapered portion 36 has an outer diameter that increases at positions away from the first joint portion 26 in a direction extending along the center axis CA1 of the hub body 24. Thus, during relative rotation of the first joint portion 26 and the wheel unit 12 about the center axis CA1 of the hub body 24, the tapered portion 36 restricts movement of the wheel unit 12 toward the second large diameter end 34A. The tapered portion 36 can be omitted from the second large diameter portion 34.

As shown in FIG. 3, the hub unit 20 further includes a transmission portion 42 transmitting at least human driving force to the hub body 24. The transmission portion 42 is arranged, for example, on the second large diameter end 34A of the hub body 24. In one example, the rear sprocket D2 is coupled to the transmission portion 42. The transmission portion 42 transmits driving force received from the rear sprocket D2 to the hub body 24. The driving force received from the rear sprocket D2 includes at least one of human driving force inputted to the rear sprocket D2 via, for example, the pedals C3, and driving force inputted to the rear sprocket D2 by the electric assist unit E.

The hub unit 20 further includes the shifting mechanism 44 changing the speed of an input from the transmission portion 42 and transmitting the input to the wheel unit 12. The shifting mechanism 44 is configured to change the transmission ratio of the transmission portion 42 and the wheel unit 12. The shifting mechanism 44 is located at a radially inner side of the hub body 24. In one example, the shifting mechanism 44 is an internal shifting device. The shifting mechanism 44 is mechanically or electrically driven in accordance with operation of a shift operating device H (refer to FIG. 1). The shift operating device H is arranged, for example, on the handlebar A5. In a case where the shifting mechanism 44 is electrically driven, for example, electric power of the battery BT is used. The shifting mechanism 44 includes a planetary gear mechanism. The shifting mechanism 44 is configured to change the transmission ratio, for example, by changing the coupling state of gears forming the planetary gear mechanism. In one example, the shifting mechanism 44 has at least three transmission ratios or more.

In a case where driving force input to the transmission portion 42 is transmitted to the hub body 24, the wheel unit 12 rotates together with the hub body 24 about the center axis CA1 of the hub body 24. In this case, the friction received by the wheel unit 12 from the ground (not shown) applies force to the wheel unit 12 so that the wheel unit 12 acts to rotate with respect to the hub body 24 in one direction. In a case where the brake device F applies a brake on the rotary body F1 in accordance with operation of the operating device G, the brake is applied on the wheel unit 12 in addition to the hub body 24. In this case, the friction received by the wheel unit 12 from the ground applies force to the wheel unit 12 so that the wheel unit 12 acts to rotate with respect to the hub body 24 in the other direction. The first joint portion 26 and the second joint portion 28 are configured to restrict rotation of the wheel unit 12 relative to the hub body 24 even in a case where the forces described above are applied to the wheel unit 12.

Figure 4:
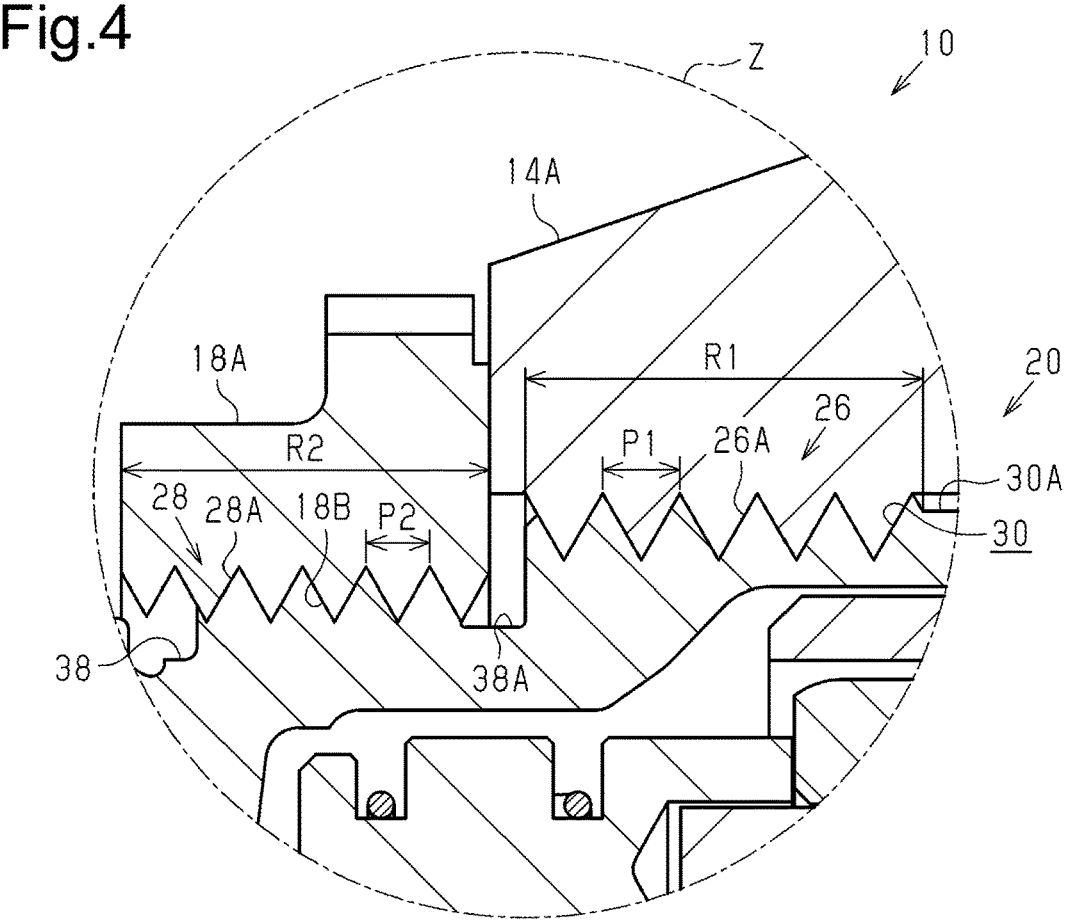
FIG. 4 is an enlarged view of a Z portion shown in FIG. 3.

The relationship between the first joint portion 26 and the second joint portion 28 will now be described with reference to FIG. 4.

The external thread 28A of the second joint portion 28 differs in shape from the external thread 26A of the first joint portion 26. The external thread 28A of the second joint portion 28 has a pitch (hereafter, referred to as "the second pitch P2"). The external thread 26A of the first joint portion 26 has a pitch (hereafter, referred to as "the first pitch P1"). The second pitch P2 differs from the first pitch P1. More specifically, in a direction extending along the center axis CA1 of the hub body 24, a movement amount corresponding to one rotation of the wheel unit 12 with respect to the first joint portion 26 around the hub axle 22 differs from a movement amount corresponding to one rotation of the restriction member 18 with respect to the second joint portion 28 around the hub axle 22. In one example, the second pitch P2 is shorter than the first pitch P1. The second pitch P2 can be longer than the first pitch P1. The difference of the first pitch P1 and the second pitch P2 limits integral rotation of the wheel unit 12 and the restriction member 18. In other words, the first joint portion 26 and the second joint portion 28 are configured to restrict integral rotation of the wheel unit 12 and the restriction member 18. Thus, even in a case where force is applied to the wheel unit 12 in different rotational directions, rotation of the wheel unit 12 relative to the hub body 24 is restricted.

In the direction extending along the center axis CA1 of the hub body 24, the range in which the external thread 26A of the first joint portion 26 is arranged (hereafter, referred to as "the first range R1") is wider than the range in which the external thread 28A of the second joint portion 28 is arranged (hereafter, referred to as "the second range R2"). The first range R1 can be the same width as the second range R2 or can be narrower than the second range R2.

Second Embodiment

Figure 5:
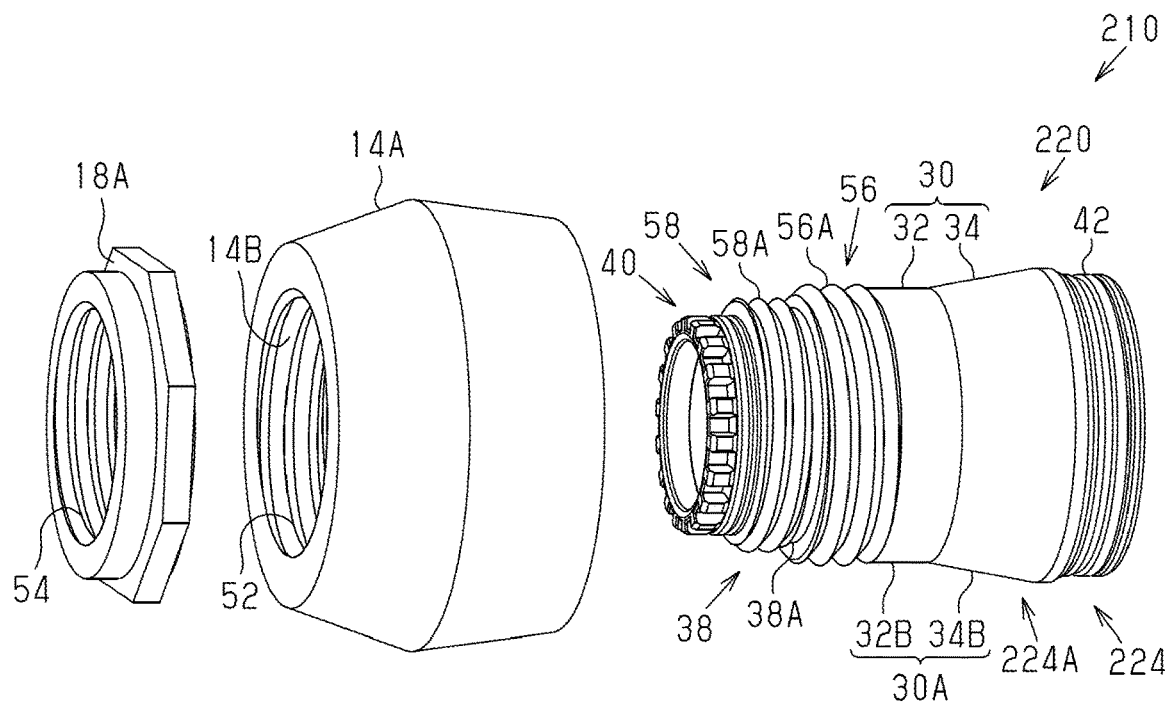
FIG. 5 is an exploded perspective view of a second embodiment of a bicycle wheel assembly.

A second embodiment of a bicycle wheel assembly 210 including a hub unit 220 will now be described with reference to FIG. 5. The same reference characters are given to those components that are the same as the corresponding components of the first embodiment. Such components will not be described in detail. FIG. 5 does not show a part of the wheel unit 12.

A hub body 224 includes a first joint portion 56 and a second joint portion 58. The first joint portion 56 includes an external thread 56A coupled to an internal thread 52 of the wheel unit 12. The second joint portion 58 is coupled to the restriction member 18, which restricts relative rotation of the first joint portion 56 and the wheel unit 12. The first joint portion 56 is arranged, for example, on the outer circumference 32B of the first large diameter portion 32. The internal thread 52 of the wheel unit 12 is arranged, for example, on the inner circumferential surface 14B of the hub coupling portion 14A at a portion corresponding to the external thread 56A of the first joint portion 56. The second joint portion 58 is arranged, for example, on the outer circumference 38A of the small diameter portion 38. The second joint portion 58 includes an external thread 58A coupled to an internal thread 54 of the nut 18A.

The external thread 58A of the second joint portion 58 differs in shape from the external thread 56A of the first joint portion 56. The external thread 58A of the second joint portion 58 differs in the winding direction from the external thread 56A of the first joint portion 56. The winding direction of the external thread 56A of the first joint portion 56 is, for example, right-handed. That is, the external thread 56A of the first joint portion 56 is a right-handed thread. The winding direction of the external thread 58A of the second joint portion 58 is, for example, left-handed. That is, the external thread 58A of the second joint portion 58 is a left-handed thread. In a case where the winding direction of the external thread 56A of the first joint portion 56 is left-handed, the winding direction of the external thread 58A of the second joint portion 58 can be right-handed. The difference in the winding direction between the external thread 56A of the first joint portion 56 and the external thread 58A of the second joint portion 58 limits integral rotation of the wheel unit 12 and the restriction member 18. In other words, the first joint portion 56 and the second joint portion 58 are configured to restrict integral rotation of the wheel unit 12 and the restriction member 18. Thus, even in a case where force is applied to the wheel unit 12 in different rotation directions, rotation of the wheel unit 12 relative to the hub body 224 is restricted.

The pitch (hereafter, referred to as "the third pitch") of the external thread 56A of the first joint portion 56 and the pitch (hereafter, referred to as "the fourth pitch") of the external thread 58A of the second joint portion 58 have the relationship described below. In a first example, the fourth pitch is shorter than the third pitch. In a second example, the fourth pitch is longer than the third pitch. In a third example, the fourth pitch is the same as the third pitch.

Third Embodiment

Figure 6:
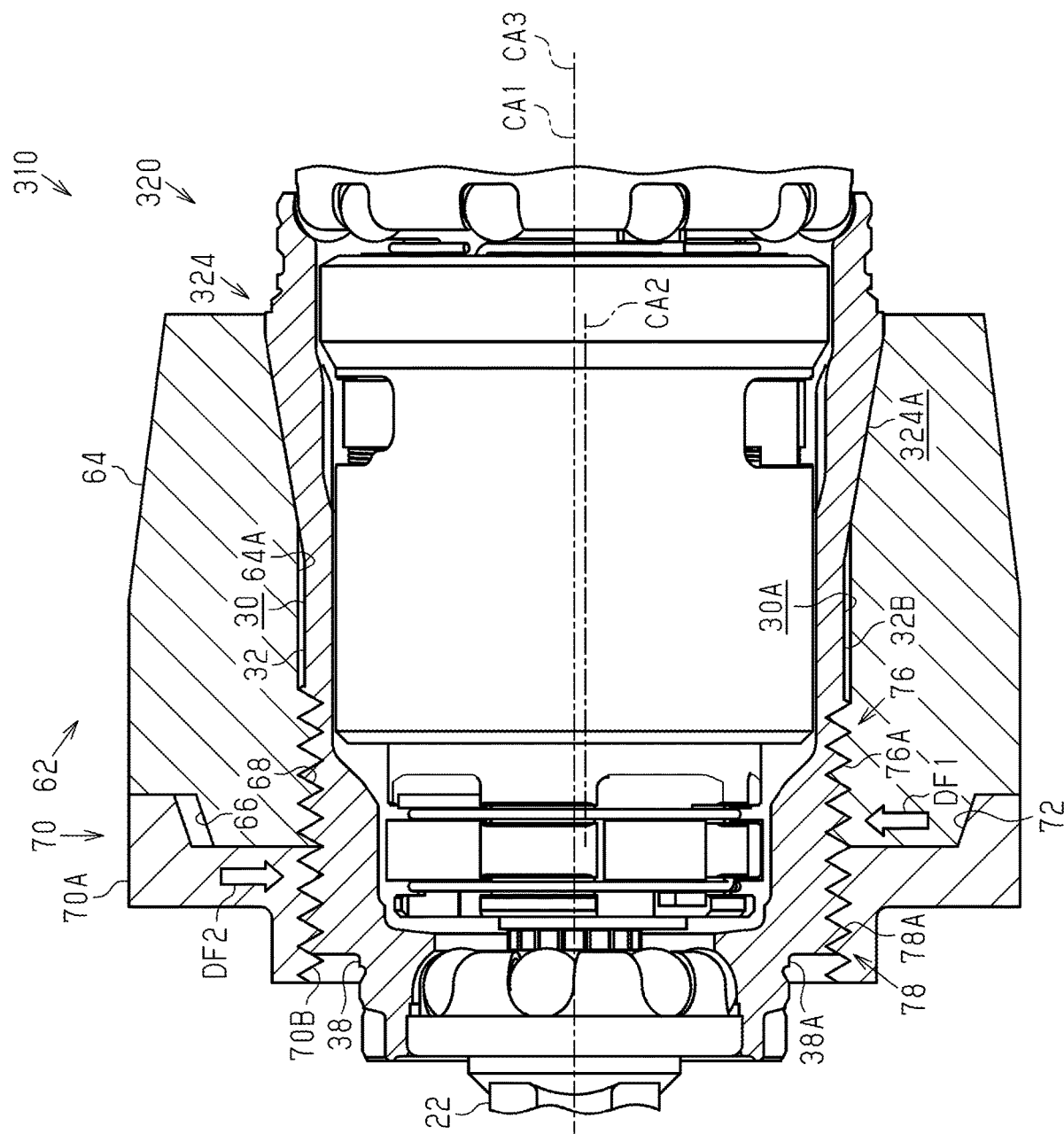
FIG. 6 is a partially cross-sectional view of a third embodiment of a bicycle wheel assembly.

A third embodiment of a bicycle wheel assembly 310 will now be described with reference to FIG. 6. The same reference characters are given to those components that are the same as the corresponding components of the first embodiment. Such components will not be described in detail.

The bicycle A includes the bicycle wheel assembly 310 (hereafter, referred to as "the wheel assembly 310"). The wheel assembly 310 is the rear wheel A4. The wheel assembly 310 includes a hub unit 320, a wheel unit 62, and a restriction member 70. The wheel unit 62 includes a hub coupling portion 64 coupled to a hub body 324. One of the materials forming the hub coupling portion 64 includes at least a resin. The hub coupling portion 64 is, for example, coupled to an outer circumference 324A of the hub body 324 to cover the hub body 324. The wheel unit 62 has substantially the same structure as the wheel unit 12 except for the hub coupling portion 64. In one example, in the wheel unit 62, the hub coupling portion 64, the rim 14C, and all of the plurality of spokes 14D are arranged integrally with each other. FIG. 6 does not show a part of the wheel unit 62.

The hub body 324 includes a first joint portion 76 and a second joint portion 78. The first joint portion 76 includes an external thread 76A coupled to an internal thread 68 of the wheel unit 62. The second joint portion 78 is coupled to the restriction member 70, which restricts relative rotation of the first joint portion 76 and the wheel unit 62. The first joint portion 76 is arranged, for example, on the outer circumference 32B of the first large diameter portion 32. The internal thread 68 of the wheel unit 62 is arranged, for example, on an inner circumferential surface 64A of the hub coupling portion 64 at a portion corresponding to the external thread 76A of the first joint portion 76. The second joint portion 78 is arranged, for example, on the outer circumference 38A of the small diameter portion 38. The restriction member 70 includes a nut 70A. The second joint portion 78 includes an external thread 78A coupled to an internal thread 70B of the nut 70A. A part of the outer diameter of the small diameter portion 38 is, for example, the same as the outer diameter of the large diameter portion 30. The entire outer diameter of the small diameter portion 38 can be smaller than the outer diameter of the large diameter portion 30. In the present embodiment, the external thread 78A of the second joint portion 78 and the external thread 76A of the first joint portion 76 are identical in shape.

The external thread 78A of the second joint portion 78 can differ in shape from the external thread 76A of the first joint portion 76. In a first example, the pitch of (hereafter, referred to as "the sixth pitch") of the external thread 78A of the second joint portion 78 is shorter than the pitch (hereafter, referred to as "the fifth pitch) of the external thread 76A of the first joint portion 76. In a second example, the sixth pitch is longer than the fifth pitch. In a third example, the winding direction of the external thread 76A of the first joint portion 76 is right-handed, and the winding direction of the external thread 78A of the second joint portion 78 is left-handed. In a fourth example, the winding direction of the external thread 76A of the first joint portion 76 is left-handed, and the winding direction of the external thread 78A of the second joint portion 78 is right-handed. In a fifth example, the first joint portion 76 and the second joint portion 78 can have a mode combining one of the first and second examples with one of the third and fourth examples.

The hub coupling portion 64 includes a first tapered surface 66. With the hub coupling portion 64 coupled to the hub body 324, the first tapered surface 66 is arranged on the hub coupling portion 64 at a portion facing the restriction member 70. The first tapered surface 66 has a diameter that decreases toward the restriction member 70 in the direction extending along the center axis CA1 of the hub body 324. The hub coupling portion 64 has a center axis CA2 that is not aligned with the center axis CA1 of the hub body 324.

The restriction member 70 includes a second tapered surface 72 in contact with the first tapered surface 66. With the restriction member 70 coupled to the hub body 324, the second tapered surface 72 is arranged on the restriction member 70 at a portion facing the hub coupling portion 64. The second tapered surface 72 has a diameter that increases toward the hub coupling portion 64 in the direction extending along the center axis CA1 of the hub body 324. The restriction member 70 has a center axis CA3 aligned with the center axis CA1 of the hub body 324. The center axis CA3 of the restriction member 70 can be out of alignment with the center axis CA1 of the hub body 324. In one example, with the wheel unit 62 and the restriction member 70 appropriately coupled to the hub body 324, a part of the first tapered surface 66 is in contact with a part of the second tapered surface 72.

The internal thread 68 of the wheel unit 62 is coupled to the external thread 76A of the first joint portion 76, and the internal thread 70B of the restriction member 70 is coupled to the external thread 78A of the second joint portion 78. The internal thread 70B of the restriction member 70 is coupled to the external thread 78A of the second joint portion 78 so that the first tapered surface 66 is in strong contact with the second tapered surface 72. As a result, force in a first direction DF1 acts on the hub coupling portion 64, and force in a second direction DF2 acts on the restriction member 70. More specifically, at a portion where the first tapered surface 66 is in contact with the second tapered surface 72, force of the restriction member 70 pushing the hub coupling portion 64 in the first direction DF1 acts on the hub coupling portion 64. At a portion where the first tapered surface 66 is not in contact with the second tapered surface 72, force acts on the restriction member 70 in the second direction DF2 due to the reaction force of the first direction DF1. Thus, the hub coupling portion 64 and the restriction member 70 are forced against the hub body 324, and rotation of the wheel unit 62 relative to the hub body 324 is restricted.

Modified Examples

The description related with each of the above embodiments, without any intention to limit, exemplifies an applicable form of a bicycle hub unit and a bicycle wheel assembly according to the present invention. The bicycle hub unit and the bicycle wheel assembly according to the present invention are applicable to, for example, modified examples of the above embodiments described below and at least two of the modified examples that do not contradict each other. In the modified examples described below, the same reference characters are given to those components that are the same as the corresponding components of the above embodiments. Such components will not be described in detail.

The configurations of the second joint portions 28 and 58 can be changed in any manner. In one example, the second joint portions 28 and 58 are coupled to the restriction member 18, for example, by adhesion, fusing, or welding.

The configuration of the shifting mechanism 44 can be changed in any manner. In one example, the shifting mechanism 44 is an external shifting device. In this example, the drivetrain B includes multiple rear sprockets D2. The shifting mechanism 44 can be omitted from the hub unit 20.

The configurations of the wheel units 12 and 62 can be changed in any manner. In a first example, the wheel units 12 and 62 are configured so that at least one of the hub coupling portions 14A and 64, the rim 14C, and the plurality of spokes 14D is separately arranged. In a second example, the material forming the hub coupling portions 14A and 64 does not include resin. In this example, the material forming the hub coupling portions 14A and 64 is, for example, metal. In a third example, the material forming the rim 14C does not include resin. In this example, the material forming the rim 14C is, for example, metal. In a fourth example, the material forming the spokes 14D does not include resin. In this example, the material forming the spokes 14D is, for example, metal.

The brake devices F can be changed to any type. In a first example, the brake devices F are disc brake devices. A disc brake device is one example of a hub brake. In this example, the rotary bodies F1 are disc brake rotors. In a second example, the brake devices F are rim brake devices. In this example, the rotary bodies F1 are the rims 14C.

DESCRIPTION OF REFERENCE CHARACTERS 10) bicycle wheel assembly, 12) wheel unit, 12A) wheel unit, 14A) hub coupling portion, 14C) rim, 14D) spoke, 16) internal thread, 18) restriction member, 18A) nut, 18B) internal thread, 20) bicycle hub unit, 20A) bicycle hub unit, 22) hub axle, 24) hub body, 24A) outer circumference, 26) first joint portion, 26A) external thread, 28) second joint portion, 28A) external thread, 30) large diameter portion, 30A) outer circumference, 32) first large diameter portion, 32A) first large diameter end, 32B) outer circumference, 34) second large diameter portion, 34A) second large diameter end, 34B) outer circumference, 36) tapered portion, 38) small diameter portion, 38A) outer circumference, 40) rotary body coupling portion, 42) transmission portion, 44) shifting mechanism, 52) internal thread, 54) internal thread, 56) first joint portion, 56A) external thread, 58) second joint portion, 58A) external thread, 60) bicycle wheel assembly, 62) wheel unit, 64) hub coupling portion, 66) first tapered surface, 68) internal thread, 70) restriction member, 70A) nut, 70B) internal thread, 72) second tapered surface, 76) first joint portion, 76A) external thread, 78) second joint portion, 78A) external thread, A) bicycle, A4) rear wheel, F) brake device, F1) rotary body, CA1) center axis, CA2) center axis, CA3) center axis

The invention claimed is:

1. A bicycle hub unit coupled to a rotary body to which a brake is applied by a brake device, the bicycle hub unit comprising:
a hub body that rotates around a hub axle; and
a rotary body coupling portion that couples the rotary body to the hub body, wherein
the hub body includes a first joint portion and a second joint portion,
the first joint portion includes an external thread coupled to an internal thread of a wheel unit, and
the second joint portion is coupled to a restriction member that restricts relative rotation of the first joint portion and the wheel unit.

2. The bicycle hub unit according to claim 1, wherein the second joint portion is arranged on an outer circumference of the hub body.

3. The bicycle hub unit according to claim 2, wherein the second joint portion includes an external thread coupled to an internal thread of the restriction member.

4. The bicycle hub unit according to claim 3, wherein the external thread of the second joint portion differs in shape from the external thread of the first joint portion.

5. The bicycle hub unit according to claim 4, wherein the external thread of the second joint portion differs in pitch from the external thread of the first joint portion.

6. The bicycle hub unit according to claim 5, wherein the external thread of the second joint portion has a shorter pitch than the external thread of the first joint portion.

7. The bicycle hub unit according to claim 4, wherein the external thread of the second joint portion and the external thread of the first joint portion are wound in opposite directions.

8. The bicycle hub unit according to claim 7, wherein
the winding direction of the external thread of the first joint portion is right-handed, and
the winding direction of the external thread of the second joint portion is left-handed.

9. The bicycle hub unit according to claim 3, wherein in a direction extending along a center axis of the hub body, a range in which the external thread of the first joint portion is arranged is wider than a range in which the external thread of the second joint portion is arranged.

10. The bicycle hub unit according to claim 2, wherein
the hub body further includes a large diameter portion and a small diameter portion, and
the second joint portion is arranged on an outer circumference of the small diameter portion.

11. The bicycle hub unit according to claim 10, wherein the first joint portion is arranged on an outer circumference of the large diameter portion.

12. The bicycle hub unit according to claim 11, wherein the large diameter portion has a smaller outer diameter than the restriction member.

13. The bicycle hub unit according to claim 11, wherein
the large diameter portion includes a first large diameter end located toward the small diameter portion, a second large diameter end opposite to the first large diameter end, a first large diameter portion including the first large diameter end, and a second large diameter portion including the second large diameter end, and
the first joint portion is arranged on an outer circumference of the first large diameter portion.

14. The bicycle hub unit according to claim 13, wherein
the second large diameter portion includes a tapered portion, and
the taper portion has an outer diameter that increases at positions away from the first joint portion in a direction extending along a center axis of the hub body.

15. The bicycle hub unit according to claim 1, further comprising a transmission portion that transmits at least human driving force to the hub body.

16. The bicycle hub unit according to claim 15, further comprising a shifting mechanism that changes speed of an input from the transmission portion and transmits the input to the wheel unit.

17. The bicycle hub unit according to claim 16, wherein the shifting mechanism is configured to change a transmission ratio of the transmission portion and the wheel unit.

18. The bicycle hub unit according to claim 17, wherein the shifting mechanism has at least three transmission ratios.

19. The bicycle hub unit according to claim 16, wherein the shifting mechanism is located at a radially inner side of the hub body.

20. The bicycle hub unit according to claim 1, further comprising the hub axle.

21. A bicycle wheel assembly comprising:
the bicycle hub unit according to claim 1;
the wheel unit; and
the restriction member,
wherein the wheel unit includes a hub coupling portion coupled to the hub body.

22. The bicycle wheel assembly according to claim 21, wherein
the restriction member includes a nut, and
the second joint portion includes an external thread coupled to an internal thread of the nut.

23. The bicycle wheel assembly according to claim 22, wherein
the hub coupling portion includes a first tapered surface,
the restriction member includes a second tapered surface in contact with the first tapered surface,
the first tapered surface has a diameter that decreases toward the restriction member in a direction extending along a center axis of the hub body, and
the second tapered surface has a diameter that increases toward the hub coupling portion in the direction extending along the center axis of the hub body.

24. The bicycle wheel assembly according to claim 23, wherein the hub coupling portion has a center axis that is not aligned with the center axis of the hub body.

25. The bicycle wheel assembly according to claim 24, wherein the restriction member has a center axis that is aligned with the center axis of the hub body.

26. The bicycle wheel assembly according to claim 21, wherein the wheel unit further includes a rim.

27. The bicycle wheel assembly according to claim 26, wherein a material forming the rim includes at least a resin.

28. The bicycle wheel assembly according to claim 26, wherein the wheel unit further includes a spoke that connects the rim and the hub coupling portion.

29. The bicycle wheel assembly according to claim 28, wherein a material forming the spoke includes at least a resin.

30. The bicycle wheel assembly according to claim 21, wherein a material forming the hub coupling portion includes at least a resin.

31. The bicycle wheel assembly according to claim 21, wherein the bicycle wheel assembly is a rear wheel.

* * * * *